H. B. SMITH.
COPY-HOLDER.
No. 174,743. Patented March 14, 1876.
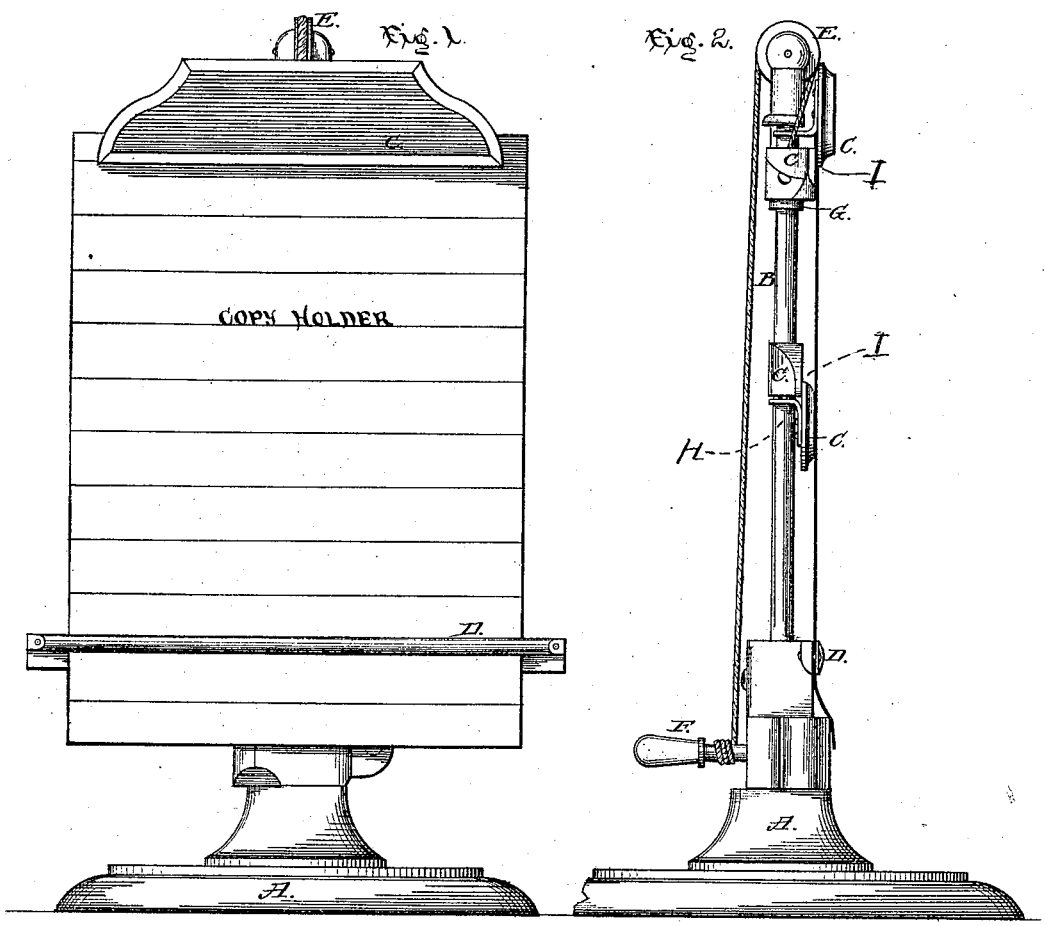

UNITED STATES PATENT OFFICE.

HIRAM B. SMITH, OF PHILADELPHIA, PENNSYLVANIA, ASSIGNOR OF THREE-FOURTHS HIS RIGHT TO OSBORN CONRAD, OF SAME PLACE.

IMPROVEMENT IN COPY-HOLDERS.

Specification forming part of Letters Patent No. 174,743, dated March 14, 1876; application filed January 12, 1876.

*To all whom it may concern:*

Be it known that I, HIRAM B. SMITH, of Philadelphia, Pennsylvania, have invented certain Improvements in Copy-Holders, of which the following is a specification:

The object of my invention is to provide a convenient means of suspending copy for draftsmen, printers, conveyancers, and others, and for the exhibition of show-cards, notices, pictures, &c.

My invention consists of a pedestal, A, rod B, spring clips or holders C C, line-guide D, pulley E, windlass F, and rubber washer G. The clips C C are provided with springs H, attached to the front jaw I of the clips, said springs having holes in the other end to permit them to slide upon the rod. The opposite jaws I of the clips have also holes parallel with those of the springs H, and slide also upon the rod. Under the lower jaw I of the upper clip a rubber washer is placed, to keep it in position when the jaws I are opened. The lower end of the rod has a pointed screw cut thereon, by which it may be attached to a printer's case, dispensing with the iron base.

The operation is as follows: When used for the exhibition of show-cards, circulars, notices, or pictures, the clips are placed at the proper distance apart, and the sheet placed in both clips; or only one may be used.

When used for conveyancers or printers the lower clip is removed and the copy run through the line-guide D, and the upper end put into the upper clip. As each line is written or set the copy is raised one line higher by means of the windlass F, thus avoiding the errors of omission and repetition so common to copyists and printers.

I claim as my invention—

1. The combination of the rod B with the perforated spring H and the movable jaws I, composing the clip, constructed substantially as described.

2. The combination of the pedestal A, rod B, clip C, line-guide D, pulley E, windlass F, and washer G.

H. B. SMITH.

Witnesses:
LISLE STOKES,
CHARLES M. O'HARA.